United States Patent
McKnight et al.

(10) Patent No.: US 11,518,349 B2
(45) Date of Patent: Dec. 6, 2022

(54) AUTOMATIC BREAK APPLICATION FOR EMERGENCY STOP

(71) Applicant: Caterpillar Inc., Deerfield, IL (US)

(72) Inventors: James McKnight, Champaign, IL (US); James L. Williamson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 618 days.

(21) Appl. No.: 16/433,973

(22) Filed: Jun. 6, 2019

(65) Prior Publication Data

US 2020/0384961 A1 Dec. 10, 2020

(51) Int. Cl.
| B60T 7/00 | (2006.01) |
| B60T 7/04 | (2006.01) |
| B60T 8/32 | (2006.01) |
| B60T 7/12 | (2006.01) |
| B60T 8/172 | (2006.01) |

(52) U.S. Cl.
CPC ............ B60T 7/042 (2013.01); B60T 7/12 (2013.01); B60T 8/172 (2013.01); B60T 8/3255 (2013.01); B60T 2270/82 (2013.01)

(58) Field of Classification Search
CPC ........ B60T 2270/82; B60T 7/042; B60T 7/12; B60T 8/172; B60T 8/3255
See application file for complete search history.

(56) References Cited

U.S. PATENT DOCUMENTS

| 7,354,379 | B2 | 4/2008 | Moriya |
| 2009/0248231 | A1 | 10/2009 | Kamiya |
| 2010/0256884 | A1 | 10/2010 | Devlieg |
| 2011/0226569 | A1* | 9/2011 | Devlieg ................ B60T 8/1703 188/158 |
| 2013/0238207 | A1* | 9/2013 | Gonzalez Romero ...................... B60T 8/3275 701/70 |
| 2013/0240312 | A1 | 9/2013 | Jensen et al. |
| 2017/0008528 | A1* | 1/2017 | Nakatsuka ........... B60W 50/10 |
| 2017/0036659 | A1* | 2/2017 | Murakami ........... B60T 13/662 |
| 2017/0107690 | A1* | 4/2017 | Yamashita ............. E02F 9/123 |
| 2017/0259798 | A1* | 9/2017 | Toole .................... B60W 30/00 |
| 2017/0291585 | A1* | 10/2017 | Kobune ............... B60T 13/741 |
| 2018/0052463 | A1 | 2/2018 | Mays |
| 2018/0072292 | A1* | 3/2018 | Renaud .................. B60T 7/042 |
| 2018/0319381 | A1* | 11/2018 | Vitale ...................... B60T 7/18 |
| 2019/0001941 | A1* | 1/2019 | Westlund ............. B60T 8/1701 |
| 2019/0032737 | A1* | 1/2019 | Burns ................ F16D 65/0972 |
| 2019/0202421 | A1* | 7/2019 | Healy ................... B60T 8/1708 |

FOREIGN PATENT DOCUMENTS

| JP | 09193786 | 7/1997 |
| KR | 1020120051531 | 5/2012 |

* cited by examiner

*Primary Examiner* — Truc M Do
(74) *Attorney, Agent, or Firm* — Harrity & Harrity LLP (57) ABSTRACT

An electronic control unit (ECU) is disclosed. The ECU may detect an emergency stopping event associated with a vehicle. The ECU may determine, based on detecting the emergency stopping event, that electro-hydraulic brakes of the vehicle are in a disabled mode. The ECU may determine, based on determining that the electro-hydraulic brakes are in the disabled mode, a position of a brake pedal of the vehicle. The ECU may override, based on the position of the brake pedal, the disabled mode to engage the electro-hydraulic brakes during the emergency stopping event.

20 Claims, 4 Drawing Sheets

AUTOMATIC BREAK APPLICATION FOR EMERGENCY STOP

TECHNICAL FIELD

The present disclosure relates generally to braking systems and, more particularly, to automatic brake application for emergency stop.

BACKGROUND

A braking system of a vehicle may control braking or stopping of the vehicle. In some cases, one or more brakes of the braking system may be switched to a disabled mode, in which the one or more brakes are not engaged when an operator of the vehicle provides an input via a brake pedal of the braking system. As a result, the one or more brakes may not be engaged during an emergency stopping event of the vehicle, which decreases the capability of the braking system to slow and/or stop the vehicle during the emergency stopping event. This can lead to increased braking time and/or distance of the vehicle during the emergency stopping event, which can lead to catastrophic events such as a vehicle crash, damaged property, and/or loss of life.

One approach to braking during an emergency stopping event is disclosed in U.S. Patent Application Publication No. 2009/0248231 that published on Oct. 1, 2009. In particular, the '231 publication discloses an emergency stopping operation of a vehicle is controlled based on an emergency stop control signal. The '231 publication further discloses that a second logic circuit 80 controls operation of a driving/braking device which includes the ignition unit 34 and the solenoid brake 38 based on the emergency stop control signal from the first logic circuit 66, thereby controlling emergency stopping operation of the vehicle 10.

While the emergency stop control signal of the '231 publication may permit controlling emergency stopping operation of the vehicle 10, the '231 publication does not address the issue of brakes that are in a disabled mode during the emergency stopping operation of the vehicle 10.

The braking system of the present disclosure may be capable of automatically detecting an emergency stopping event associated with a vehicle, may be capable of overriding a disabled mode of one or more brakes of the vehicle in order to engage the one or more brakes during the emergency stopping event, and/or capable of solving other problems in the art.

SUMMARY

According to some implementations, the present disclosure is related to a method that includes detecting an emergency stopping event associated with a vehicle; determining, based on detecting the emergency stopping event, that electro-hydraulic brakes of the vehicle are in a disabled mode; determining, by the ECU and based on determining that the electro-hydraulic brakes are in the disabled mode, a position of a brake pedal of the vehicle; and overriding, by the ECU and based on the position of the brake pedal, the disabled mode to engage the electro-hydraulic brakes during the emergency stopping event.

According to some implementations, the present disclosure is related to an electronic control unit (ECU) that includes one or more memories and one or more processors, communicatively coupled to the one or more memories, to detect an emergency stopping event associated with a vehicle based on a rate of change in a position of a brake pedal of the vehicle; determine, based on detecting the emergency stopping event, that electro-hydraulic brakes of the vehicle are in a disabled mode; determine, based on determining that the electro-hydraulic brakes are in the disabled mode, the position of a brake pedal of the vehicle; and override, based on the position of the brake pedal, the disabled mode to engage the electro-hydraulic brakes during the emergency stopping event.

According to some implementations, the present disclosure is related to a system that includes electro-hydraulic front brakes of a vehicle; a brake pedal of the vehicle; and an ECU of the vehicle to detect an emergency stopping event associated with the vehicle; determine, based on detecting the emergency stopping event, that the electro-hydraulic front brakes are in a disabled mode; determine, based on determining that the electro-hydraulic front brakes are in the disabled mode, a position of the brake pedal; and override, based on the position of the brake pedal, the disabled mode to engage the electro-hydraulic front brakes in conjunction with rear brakes of the vehicle during the emergency stopping event.

DETAILED DESCRIPTION

This disclosure relates to automatic overriding a disabled mode of one or more brakes such that the one or more brakes may be applied during an emergency stopping event. The automatic overriding of the disabled mode of the one or more brakes may be performed by an electronic control unit (ECU) as described herein. The ECU described herein has universal applicability to any machine utilizing such an ECU. The term "machine" as used herein may refer to any machine that performs an operation associated with an industry such as, for example, mining, construction, farming, transportation, or any other industry. As some examples, the machine may be a vehicle such as an off-road truck, an on-road truck, a telehandler, a wheel loader, a wheel dizer aa tractor, and/or other on-road and/or off-road vehicles. Moreover, one or more implements may be connected to the machine and driven from the ECU.

Figure 1:
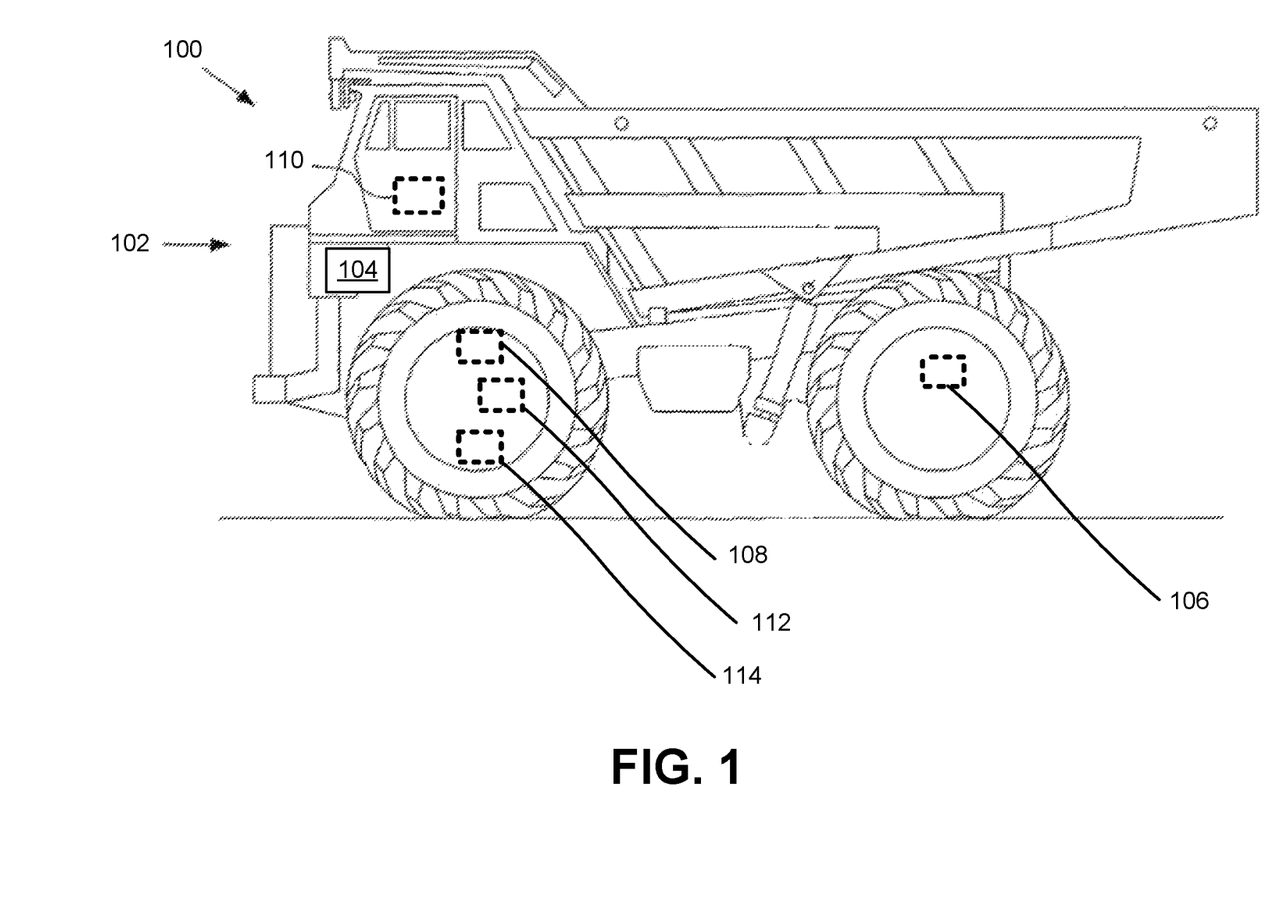
FIG. 1 is diagram of an example vehicle and braking system described herein.

FIG. 1 is a diagram of an example vehicle 100 and braking system 102 described herein. As shown in FIG. 1, braking system 102 may be included in vehicle 100, and may include an ECU 104, one or more rear brakes 106, one or more front brakes 108, a brake pedal 110, a speed sensor 112, and an automatic brake retarder 114.

Braking system 102 may control braking or stopping of vehicle 100. For example, ECU 104 may determine a position of brake pedal 110, and may engage rear brakes 106 and/or front brakes 108, based on the position of brake pedal 110, to slow and/or stop the travel of vehicle 100. As another example, automatic brake retarder 114 may automatically detect a speed at which vehicle 100 is traveling (or may receive, from speed sensor 112, an indication of the speed at which vehicle 100 is traveling) and may engage in order to slow and/or stop the travel of vehicle 100.

Rear brakes 106 and front brakes 108 may include various types of brakes. For example, rear brakes 106 and/or front brakes 108 may include "wet" brakes, or brakes that are liquid cooled by an oil or another type of liquid. As another example, rear brakes 106 and/or front brakes 108 may include "dry" brakes, or brakes that are open air cooled such as electro-hydraulic brakes (e.g., brakes that convert a control input to a flow of hydraulic fluid). While dry brakes may be less complex and less costly than wet brakes, dry brakes may be susceptible to more frequent overheating and wear out faster relative to wet brakes. Accordingly, vehicle 100 may include a means (e.g., a lever, a switch, an electronic input, and/or the like) for disabling dry brakes. In this case, vehicle 100 may operate with the dry brakes in a disabled mode such that only the wet brakes are applied when brake pedal 110 is engaged by an operator of vehicle 100.

In some implementations, ECU 104 may be capable of overriding the disabled mode of one or more brakes of braking system 102. For example, if front brakes 108 are electro-hydraulic brakes that are in a disabled mode, and if ECU 104 detects an emergency stopping event, ECU 104 may override the disabled mode to engage front brakes 108 during the emergency stopping event in order to more effectively slow or stop vehicle 100 than if only (wet) rear brakes 106 were used to slow or stop vehicle 100 during the emergency stopping event.

Brake pedal 110 may include various types of brake inputs, such as a floor-mounted brake pedal (e.g., a brake input that may be operated via a foot of the operator), a drive-shaft mounted brake lever, a dash or console mounted brake lever, and/or the like. Speed sensor 112 may be mounted on or near the wheels of vehicle 100, and may include one or more sensors that are capable of generating data associated with a speed of travel of vehicle 100.

Automatic brake retarder 114 may include various types of brake retarders that are capable of automatically engaging to slow the travel of vehicle 100. The operator of vehicle 100 may use automatic brake retarder 114 in various scenarios, such as slowing or maintaining a steady speed of downhill travel in order to prevent "runaway" scenario where vehicle 100 accelerates out of control. In this case, the use of automatic brake retarder 114, where a full stop of vehicle 100 is not intended (e.g., where maintaining a steady speed of travel or partially slowing the speed of travel of vehicle 100), may decrease the usage of rear brakes 106 and/or front brakes 108, which may increase the life of rear brakes 106 and/or front brakes 108.

As indicated above, FIG. 1 is provided as an example. Other examples may differ from what was described in connection with FIG. 1.

Figure 2:
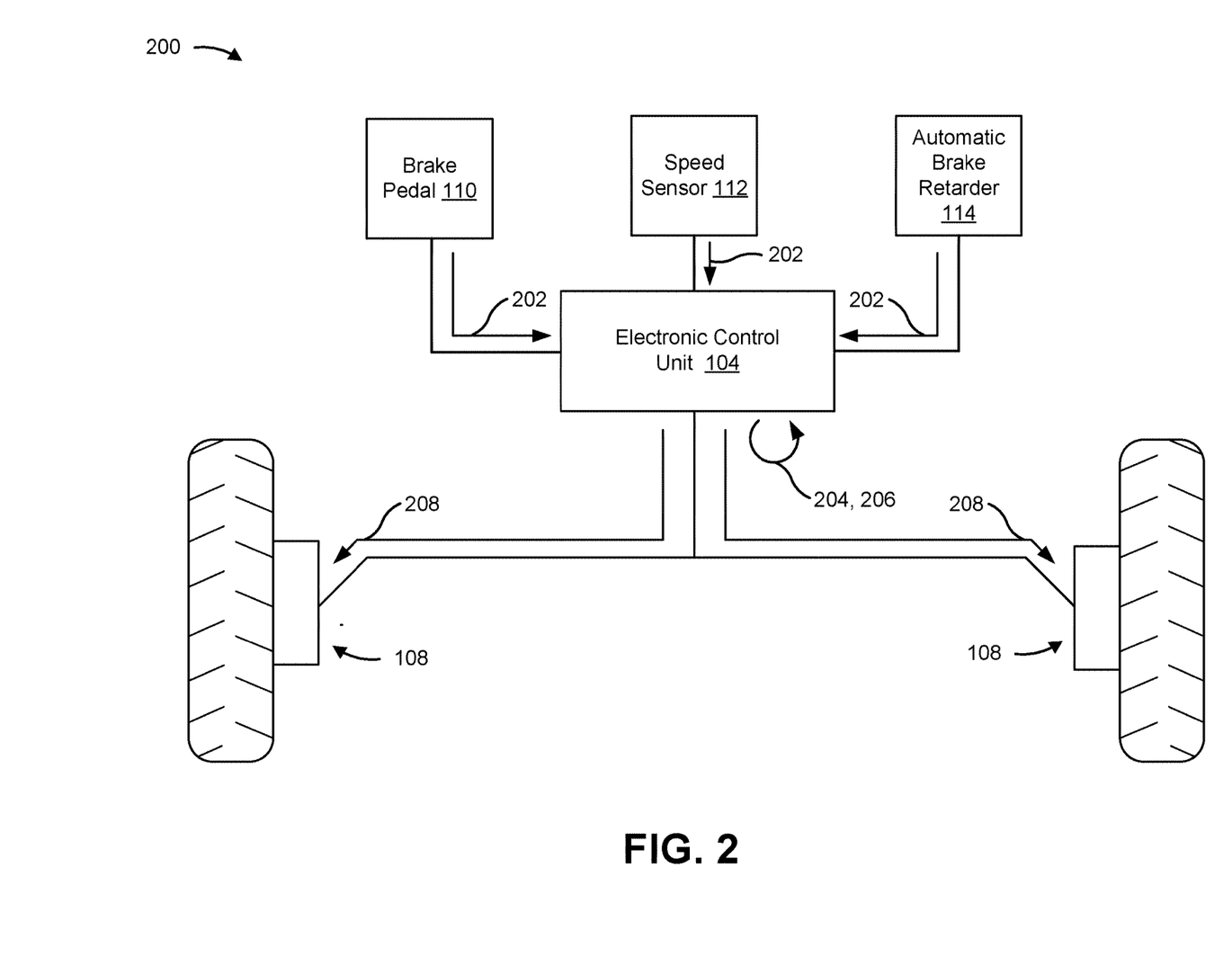
FIG. 2 is diagram of an example implementation described herein.

FIG. 2 is a diagram of an example implementation 200 described herein. Example implementation 200 may illustrate one or more examples of one or more devices of braking system 102 performing automatic brake application for emergency stop.

As shown in FIG. 2, and by reference number 202, ECU 104 may receive information from various devices included in braking system 102. For example, ECU 104 may receive, from brake pedal 110, information indicating a position of brake pedal 110, information indicating a rate of change in the position of brake pedal 110, and/or the like. As another example, ECU 104 may receive, from speed sensor 112, information indicating a speed at which vehicle 100 is traveling and/or the like. As another example, ECU 104 may receive, from automatic brake retarder 114, information indicating whether automatic brake retarder 114 is engaged and/or the like.

The information indicating the position of brake pedal 110 may include a voltage, a current, an inductance, a resistance, an impedance, a signal, and/or the like. ECU 104 may determine the position of brake pedal 110 based on determining a position set point corresponding to the voltage, current, inductance, resistance, impedance, signal, and/or the like. The voltage, current, inductance, resistance, impedance, signal, and/or the like may be provided by one or more sensors of brake pedal 110, including a rotary variable differential transformer (RVDT), a linear variable differential transformer (LVDT), and/or another type of position sensor, angle sensor, or displacement sensor that is capable of measuring the position of brake pedal 110 and converting the position to a voltage, a current, an inductance, a resistance, an impedance, a signal, and/or the like. Moreover, ECU 104 may determine the rate of change in the position of brake pedal 110 by monitoring changes, over time, in the position voltage, current, inductance, resistance, impedance, signal, and/or the like.

The information indicating the speed of vehicle 100 may include wheel speed sensor data, revolutions per minute (RPM) data, and/or the like associated with rotation of the wheels of vehicle 100. ECU 104 may determine the speed at which vehicle 100 is traveling by converting, based at least in part on an algorithm, a ratio, a conversion formula, and/or the like, the wheel speed data and/or RPM data to the speed at which vehicle 100 is traveling. ECU 104 may further determine acceleration and/or deceleration information, associated with vehicle 100, from the information indicating the speed of vehicle 100.

The information indicating whether automatic brake retarder 114 is engaged may indicate whether automatic brake retarder 114 is engaged and providing automatic retardation to the wheels of vehicle 100. Moreover, the information indicating whether automatic brake retarder 114 is engaged may indicate an amount of automatic retardation that is being applied to the wheels of vehicle 100.

As further shown in FIG. 2, and by reference number 204, ECU 104 may detect an emergency stopping event associated with vehicle 100. ECU 104 may detect the emergency stopping event based on the information received from the various devices included in braking system 102. For example, ECU 104 may detect the emergency stopping event based on determining that the rate of change in the position of brake pedal 110 satisfies a threshold rate of change.

ECU 104 may detect the emergency stopping event based on the speed at which vehicle 100 is traveling. For example, ECU 104 may detect the emergency stopping event based on determining that the speed at which vehicle 100 is traveling satisfies a speed threshold, based on determining that acceleration of the speed at which vehicle 100 is traveling satisfies an acceleration threshold (e.g., which may indicate that vehicle 100 is accelerating out of the operator's control), based on determining that deceleration of the speed at which vehicle 100 is traveling satisfies a deceleration threshold (e.g., which may indicate that the operator is attempting to quickly slow and/or stop vehicle 100), and/or the like.

ECU 104 may detect the emergency stopping event based on automatic brake retarder 114 being engaged, based on an amount of automatic retardation being applied by automatic brake retarder 114 satisfying an automatic retardation threshold, and/or the like.

In some implementations, ECU 104 may detect the emergency stopping event based on determining that any of the above-described thresholds are satisfied. In some implementations, ECU 104 may detect the emergency stopping event based on a combination of the above-described thresholds. For example, ECU 104 may detect the emergency stopping event based on determining that two or more of the above-described thresholds are satisfied, based on determining that three or more of the above-described thresholds are satisfied, and/or the like. In this case, ECU 104 may adjust a threshold based on determining that another threshold is satisfied. For example, ECU 104 may lower the threshold rate of change in the position of brake pedal 110 based on determining that the acceleration threshold is satisfied, and/or the like.

As further shown in FIG. 2, and by reference number 206, ECU 104 may determine whether one or more brakes of vehicle 100 (e.g., rear brakes 106, front brakes 108, and/or the like) are in a disabled mode. The one or more brakes may include electro-hydraulic brakes and/or another type of dry brake that may be disabled. For example, ECU 104 may track and store a status, of the one or more brakes of vehicle 100, in a memory device, a database, a storage device, and/or the like, and may determine whether the one or more brakes are in a disabled mode based on the stored status. As another example, the one or more brakes may provide, to ECU 104, an indicator of whether the one or more brakes are in a disabled mode. The indicator may include a voltage, a current, an inductance, a resistance, an impedance, a signal, and/or the like. ECU 104 may determine whether the one or more brakes are in a disabled mode based on the presence or absence of the voltage, current, inductance, resistance, impedance, signal, and/or the like. ECU 104 may determine to override the disabled mode of the one or more brakes, in order to engage the one or more brakes during the emergency stopping event, based on detecting the emergency event and determining that the one or more brakes are in the disabled mode.

As further shown in FIG. 2, and by reference number 208, ECU 104 may override the disabled mode of the one or more brakes in order to engage the one or more brakes during the emergency stopping event. ECU 104 may engage the one or more brakes based on the position of brake pedal 110 (e.g., which ECU 104 may determine based on the information indicating the position of brake pedal 110). For example, ECU 104 may determine a setpoint, for the one or more brakes, based on the position of brake pedal 110. In this way, ECU 104 may override the disabled mode and apply the one or more brakes in a manner that is proportional to the operator's application of the brakes during the emergency stopping event.

The setpoint may include a control voltage setpoint, a control current setpoint, a control inductance setpoint, a control resistance setpoint, a control impedance setpoint, and/or another type of setpoint that may be used to control the amount and/or extent to which the one or more brakes are applied during the emergency stopping event. ECU 104 may apply a control input to the one or more brakes based on the setpoint. For example, if the one or more brakes are electro-hydraulic brakes (or another type of dry brakes that may be disabled), ECU 104 may determine a control current setpoint based on the position of brake pedal 110, and may apply the control current setpoint to the electro-hydraulic brakes based on the control current setpoint. The electro-hydraulic brakes may convert the control current to a flow of hydraulic fluid, which may cause the electro-hydraulic brakes to be applied to the wheels of vehicle 100 in order to slow and/or stop vehicle 100 in the emergency stopping event.

In some implementations, ECU 104 may apply the control input to the one or more brakes by ramping the control input to the setpoint. In this way, ECU 104 may engage the one or more brakes by increasing the amount and/or extent to which the one or more brakes are applied, until the setpoint is reached. ECU 104 may ramp or increase the control input to the setpoint in a linear manner (e.g., at a fixed rate) or a non-linear manner (e.g., at a variable rate). For example, and continuing with the electro-hydraulic brake example above, ECU 104 may ramp the control current, that is applied to the electro-hydraulic brakes, by linearly ramping or increasing the control current to the control current setpoint at a fixed rate. The fixed rate may be based on the speed at which vehicle 100 is traveling, the acceleration or deceleration of vehicle 100, the position of brake pedal 110, the rate of change in the position of brake pedal 110, whether automatic brake retarder 114 is engaged, an amount of automatic retardation applied by automatic brake retarder 114, and/or the like.

The one or more brakes of vehicle 100 may receive the control input and may apply a force to the wheels of vehicle 100 in order to slow and/or stop the travel of vehicle 100 based on the emergency stopping event. As an example, if the one or more brakes include front brakes 108, and front brakes 108 are electro-hydraulic brakes, front brakes 108 may receive a control current from ECU 104 and may convert the control current to a flow of hydraulic fluid (e.g., which may be based on the control current), which may cause hydraulic brake actuators to apply a force to the front wheels of vehicle 100 in order to slow and/or stop the travel of vehicle 100 based on the emergency stopping event. ECU 104 may also engage rear brakes 106 (e.g., based on the position of brake pedal 110) and/or automatic brake retarder 114 (e.g., based on a speed of travel of vehicle 100), in conjunction or combination with engaging front brakes 108, in order to slow and/or stop the travel of vehicle 100 based on the emergency stopping event.

As indicated above, FIG. 2 is provided as an example. Other examples may differ from what was described in connection with FIG. 2.

Figure 3:
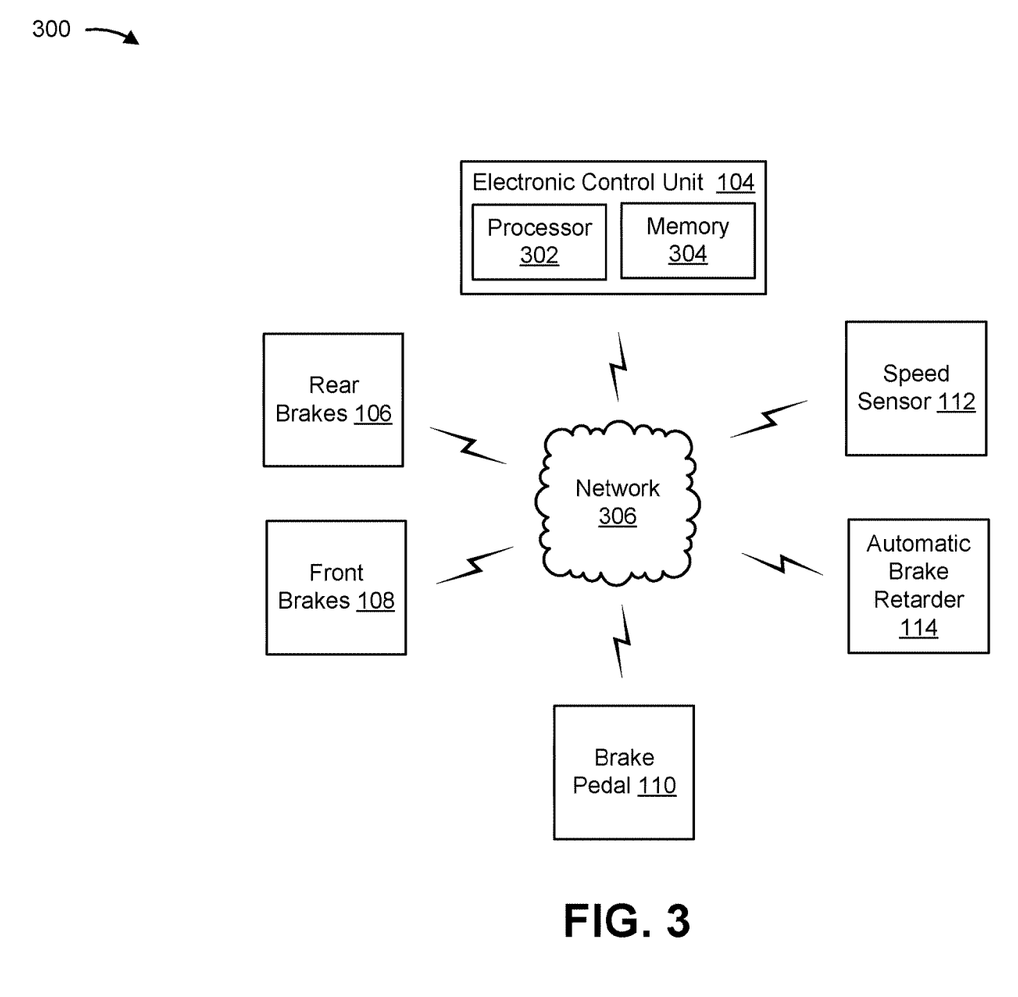
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more components of braking system 102, including ECU 104, rear brakes 106, front brakes 108, brake pedal 110, speed sensor 112, automatic brake retarder 114. The one or more components of braking system 102 may be interconnected via a network 306. The connections may include mechanical and/or electrical connections. The electrical connections may include wired connections, wireless connections, or a combination of wired and wireless connections.

ECU 104 may include one or more devices or components configured for automatic brake application for an emergency stop. For example, ECU 104 may detect an emergency stopping event associated with a vehicle in which braking system 102 is included (e.g., vehicle 100), may determine, based on detecting the emergency stopping event, that one or more brakes of the vehicle are in a disabled mode (e.g., rear brakes 106, front brakes 108, and/or the like), may determine, based on determining that the one or more brakes are in the disabled mode, a position of brake pedal 110, may override, based on the position of brake pedal 110, the disabled mode to engage the one or more brakes during the emergency stopping event.

ECU 104 may include processor 302, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 302 may implemented in hardware, firmware, and/or a combination of hardware and software. ECU 104 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by ECU 104. ECU 104 may include a memory 304 (or one or more memories) (e.g., a non-transitory computer-readable medium) capable of storing instructions that, when executed, cause processor 302 to perform one or more processes and/or methods described herein.

Rear brakes 106 and front brakes 108 may include various types of brakes. For example, rear brakes 106 and/or front brakes 108 may include various types of wet brakes, various types of dry brakes, and/or the like. Rear brakes 106 and/or front brakes 108 may be capable of being operated in an active mode (e.g., a mode where ECU 104 may engage the brakes based on actuation of brake pedal 110) and/or in a disabled mode (e.g., a mode where the brakes are not engaged based on actuation of brake pedal 110 unless ECU 104 overrides the disabled mode, such as during an emergency stopping event).

Brake pedal 110 may include one or more devices that are capable of receiving an input from an operator of a vehicle (e.g., vehicle 100) and converting the input to a voltage, a current, an inductance, a resistance, an impedance, a signal, and/or the like. For example, brake pedal 110 may include a brake pedal, a brake lever, a brake switch, and/or the like that includes an RVDT, an LVDT, and/or another type of position sensor, angle sensor, or displacement sensor that is capable of measuring the position of brake pedal 110, and providing a corresponding voltage, current, inductance, resistance, impedance, signal, and/or the like to ECU 104.

Speed sensor 112 may include one or more sensors that are capable of generating data associated with a speed of travel of a vehicle (e.g., vehicle 100). For example, speed sensor 112 may generate wheel speed sensor data, RPM data, and/or the like associated with rotation of the wheels of vehicle 100.

Automatic brake retarder 114 includes various types of brake retarders that are capable of automatically engaging to slow the travel of a vehicle (e.g., vehicle 100). The operator of the vehicle may use automatic brake retarder 114 in various scenarios, where a full stop of vehicle 100 is not intended, such that the use of automatic brake retarder 114 may decrease the usage of rear brakes 106 and/or front brakes 108, which may increase the life of rear brakes 106 and/or front brakes 108.

Network 306 includes one or more mechanical and/or electrical networks. For example, network 306 may include a hydraulic fluid network of one or more hydraulic lines, a cable network, a compressed air network of one or more compressed air lines, and/or the like. As another example, network 306 may include one or more wired and/or wireless electrical networks. For example, network 306 may include a sensor network, a controller area network (CAN), an Ethernet-based network, a cellular network, a Wi-Fi network, a Bluetooth network, and/or the like.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
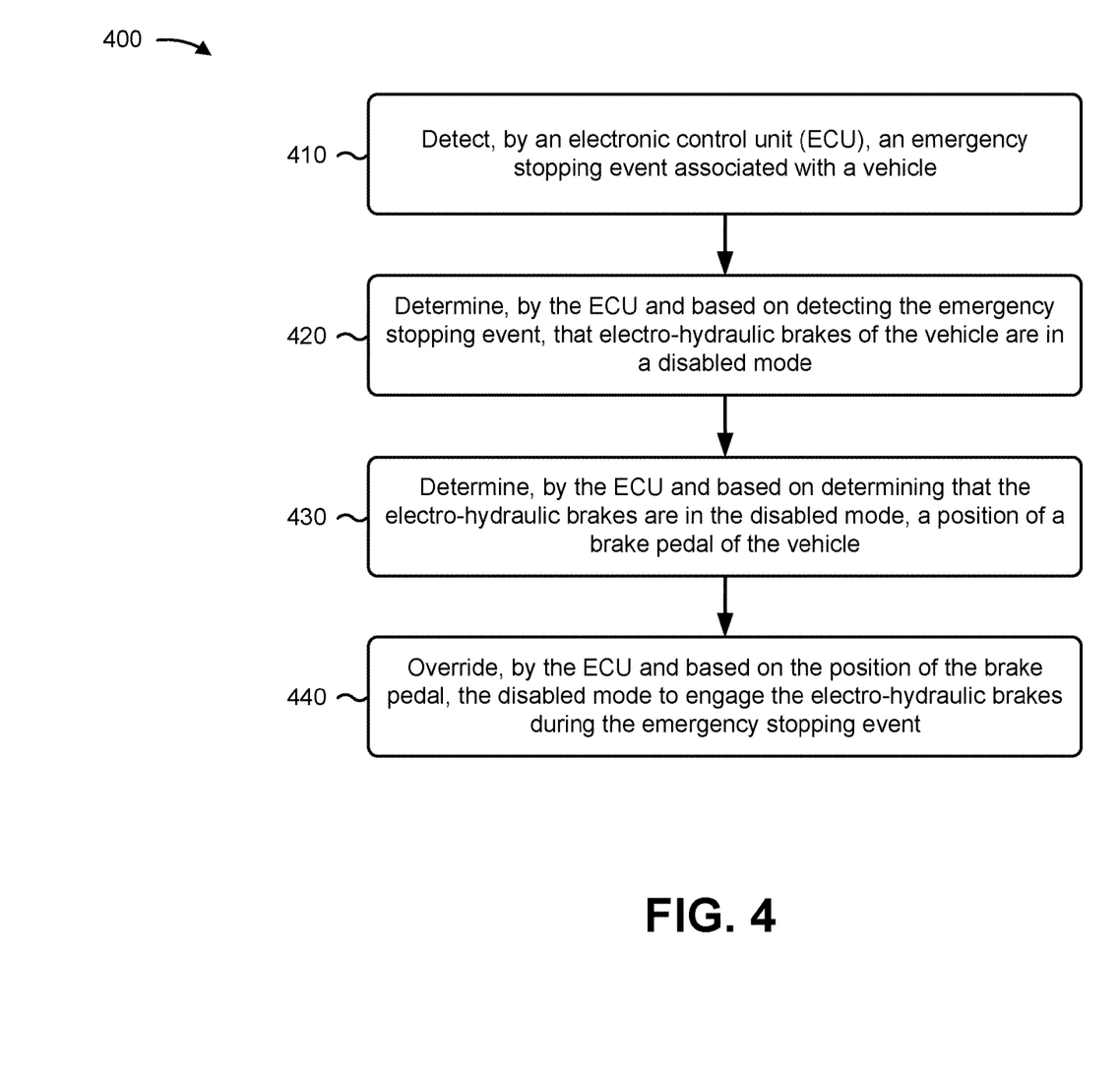
FIG. 4 is a flow chart of an example process for automatic brake application for emergency stop.

FIG. 4 is a flow chart of an example process 400 for automatic brake application for emergency stop. In some implementations, one or more process blocks of FIG. 4 may be performed by an ECU (e.g., ECU 104). In some implementations, one or more process blocks of FIG. 4 may be performed by another device or a group of devices separate from or including the ECU, such one or more brakes of a vehicle (e.g., rear brakes 106, front brakes 108, and/or the like), a brake pedal (e.g., brake pedal 110), a speed sensor (e.g., speed sensor 112), an automatic brake retarder (e.g., automatic brake retarder 114), and/or the like.

As shown in FIG. 4, process 400 may include detecting an emergency stopping event associated with a vehicle (block 410). For example, the ECU (e.g., using processor 302, memory 304, and/or the like) may detect an emergency stopping event associated with a vehicle, as described above. The ECU may detect the emergency stopping event based on various factors, such as a position of a brake pedal, a rate of change in the position of the brake pedal (e.g., based on determining that the rate of change satisfies a threshold rate of change), a speed of travel of the vehicle (e.g., based on determining that the speed of travel of the vehicle satisfies a threshold speed), whether and an amount of automatic retardation applied by an automatic brake retarder (e.g., based on determining that the amount of automatic retardation satisfies a threshold amount of automatic retardation), and/or the like.

As further shown in FIG. 4, process 400 may include determining, based on detecting the emergency stopping event, that electro-hydraulic brakes of the vehicle are in a disabled mode (block 420). For example, the ECU (e.g., processor 302, memory 304, and/or the like) may determine, based on detecting the emergency stopping event, that electro-hydraulic brakes of the vehicle are in a disabled mode, as described above. The electro-hydraulic brakes may be front brakes of the vehicle, rear brakes of the vehicle, and/or the like.

As further shown in FIG. 4, process 400 may include determining, based on determining that the electro-hydraulic brakes are in the disabled mode, a position of a brake pedal of the vehicle (block 430). For example, the ECU (e.g., using processor 302, memory 304, and/or the like) may determine, based on determining that the electro-hydraulic brakes are in the disabled mode, a position of a brake pedal of the vehicle, as described above.

As further shown in FIG. 4, process 400 may include overriding, based on the position of the brake pedal, the disabled mode to engage the electro-hydraulic brakes during the emergency stopping event (block 440). For example, the ECU (e.g., using processor 302, memory 304, and/or the like) may override, based on the position of the brake pedal, the disabled mode to engage the electro-hydraulic brakes during the emergency stopping event, as described above.

The ECU may apply the electro-hydraulic brakes (e.g., front dry brakes) in conjunction with other brakes (e.g., rear wet brakes) of the vehicle during the emergency stopping event.

The ECU may override the disabled mode to engage the electro-hydraulic brakes by determining a control current setpoint based on the position of the brake pedal and applying a control current to the electro-hydraulic brakes based on the control current setpoint. The ECU may apply the control current by ramping the control current to the control current setpoint at a fixed rate. The fixed rate may be based on a speed at which the vehicle is traveling, an acceleration or deceleration of the vehicle, the position of the brake pedal, a rate of change in the position of the brake pedal, whether an automatic brake retarder is engaged, an amount of automatic retardation applied by the automatic brake retarder, and/or the like.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed electronic control unit (ECU) (e.g., ECU 104) may be used in any braking system (e.g., braking system 102) in which one or more brakes (e.g., rear brakes 106, front brakes 108, and/or the like) may be switched to a disabled mode. In this way, one or more brakes may remain in the disabled mode to extend the life of the brakes, and the ECU may engage the one or more brakes based on detecting an emergency stopping event associated with a vehicle (e.g., vehicle 100) in which the braking system is included such that the one or more brakes may be used to increase the stopping ability of the vehicle during the emergency stopping event, which increases the safety of operating the vehicle.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    applying, by an electronic control unit (ECU), wet brakes of a vehicle without applying dry brakes of the vehicle when a brake pedal of the vehicle is engaged and the dry brakes are in a disabled mode,
        wherein the wet brakes are liquid cooled, and
        wherein the dry brakes are open air cooled;
    detecting, by the ECU, an emergency stopping event associated with the vehicle;
    determining, by the ECU and based on detecting the emergency stopping event, that the dry brakes of the vehicle are in a disabled mode;
    determining, by the ECU and based on determining that the dry brakes are in the disabled mode, a position of the brake pedal of the vehicle; and
    overriding, by the ECU and based on the position of the brake pedal, the disabled mode to engage the dry brakes in conjunction with the wet brakes during the emergency stopping event.

2. The method of claim 1, wherein detecting the emergency stopping event comprises:
    determining a rate of change in the position of the brake pedal;
    determining that the rate of change satisfies a threshold rate of change; and
    detecting the emergency stopping event based on determining that the rate of change satisfies the threshold rate of change.

3. The method of claim 1, wherein detecting the emergency stopping event comprises:
    detecting the emergency stopping event based on a speed of travel of the vehicle.

4. The method of claim 1, wherein detecting the emergency stopping event comprises:
    detecting the emergency stopping event based on an amount of automatic retardation applied by an automatic brake retarder of the vehicle.

5. The method of claim 1, wherein overriding the disabled mode to engage the dry brakes comprises:
    determining a control current setpoint based on the position of the brake pedal; and
    applying a control current to the dry brakes based on the control current setpoint.

6. The method of claim 5, wherein applying the control current to the dry brakes comprises:
    ramping the control current to the control current setpoint.

7. The method of claim 6, wherein ramping the control current to the control current setpoint comprises:
    ramping the control current to the control current setpoint at a fixed rate.

8. An electronic control unit (ECU), comprising:
    one or more memories; and
    one or more processors, communicatively coupled to the one or more memories, to:
        apply wet brakes of a vehicle without applying dry brakes based on the dry brakes being in a disabled mode,
            wherein the wet brakes are liquid cooled, and
            wherein the dry brakes are open air cooled;

detect an emergency stopping event associated with the vehicle based on a rate of change in a position of a brake pedal of the vehicle;

determine, based on detecting the emergency stopping event, that the dry brakes are in the disabled mode; and override the disabled mode to engage the dry brakes in conjunction with the wet brakes during the emergency stopping event.

9. The ECU of claim 8, wherein the one or more processors, when overriding the disabled mode to engage the dry brakes, are to:

determine a control current setpoint based on the position of the brake pedal; and apply a control current to the dry brakes based on the control current setpoint.

10. The ECU of claim 9, wherein the one or more processors, when applying the control current to the dry brakes, are to:

ramp the control current to the control current setpoint at a fixed rate.

11. The ECU of claim 10, wherein the fixed rate is based on an amount of automatic retardation applied by a brake retarder of the vehicle.

12. The ECU of claim 8, wherein the dry brakes are electro-hydraulic front brakes.

13. The ECU of claim 8, wherein the one or more processors, when detecting the emergency stopping event, are to:

determine that an automatic brake retarder of the vehicle has been engaged; and detect the emergency stopping event based on determining that the automatic brake retarder of the vehicle has been engaged.

14. The ECU of claim 8, wherein the one or more processors, when detecting the emergency stopping event based on the rate of change in the position of the brake pedal, are to:

determine that the rate of change satisfies a threshold rate of change; and detect the emergency stopping event based on determining that the rate of change satisfies the threshold rate of change.

15. A system comprising:

dry front brakes that are open air cooled;

wet rear brakes that are liquid cooled; and an electronic control unit (ECU) to:

apply the wet rear brakes without applying the dry front brakes based on the dry front brakes being in a disabled mode;

detect an emergency stopping event;

determine, based on detecting the emergency stopping event, that the dry brakes are in the disabled mode; and override the disabled mode to engage the dry front brakes in conjunction with wet rear brakes during the emergency stopping event.

16. The system of claim 15, wherein the ECU, when detecting the emergency stopping event, is to:

determine that a speed of travel satisfies a threshold speed; and detect the emergency stopping event based on determining that the speed of travel satisfies the threshold speed.

17. The system of claim 15, wherein the ECU, when detecting the emergency stopping event, is to:

detect the emergency stopping event based on at least one of:

a rate of change in a position of a brake pedal, a speed of travel, or an automatic brake retarder.

18. The system of claim 15, wherein the ECU, when overriding the disabled mode to engage the dry front brakes, is to:

determine a control current setpoint based on a position of a brake pedal; and apply a control current to the dry front brakes based on the control current setpoint.

19. The system of claim 18, wherein the ECU, when applying the control current to the dry front brakes, is to:

ramp the control current to the control current setpoint at a fixed rate.

20. The system of claim 19, wherein the fixed rate is based on an amount of automatic retardation applied by a brake retarder.

* * * * *